United States Patent
Swift et al.

(10) Patent No.: US 6,889,629 B2
(45) Date of Patent: May 10, 2005

(54) BIRD FEEDER WITH MODULAR BIRD SEED RESERVOIRS

(75) Inventors: David W. Swift, Lititz, PA (US); Edward J. Holliday, Hummelstown, PA (US); Christopher T. Rich, Leola, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 10/687,867

(22) Filed: Oct. 20, 2003

(65) Prior Publication Data

US 2004/0079290 A1 Apr. 29, 2004

Related U.S. Application Data

(63) Continuation-in-part of application No. 10/166,070, filed on Jun. 11, 2002.

(51) Int. Cl.⁷ .............................................. A01K 39/01
(52) U.S. Cl. ..................................................... 119/52.2
(58) Field of Search ............................ 119/52.2, 57.8, 119/57.9

(56) References Cited

U.S. PATENT DOCUMENTS

| | | | | |
|---|---|---|---|---|
| 2,707,454 A | * | 5/1955 | Wilkinson | 119/57.9 |
| 3,645,235 A | * | 2/1972 | Suchla | 119/52.2 |
| 4,246,869 A | * | 1/1981 | Tobin, Jr. | 119/57.8 |
| 4,327,669 A | * | 5/1982 | Blasbalg | 119/57.8 |
| 4,632,061 A | * | 12/1986 | Tucker et al. | 119/57.8 |
| 5,033,411 A | | 7/1991 | Brucker | 119/52.2 |
| 5,183,005 A | * | 2/1993 | Tyler | 119/52.2 |
| 5,291,855 A | | 3/1994 | Laverty | 119/52.3 |
| 5,558,040 A | | 9/1996 | Colwell et al. | 119/52.2 |
| 5,791,286 A | | 8/1998 | Taussig | 119/52.3 |
| 5,970,913 A | | 10/1999 | Bloedorn | 119/57.8 |
| 6,360,690 B1 | * | 3/2002 | Canby | 119/52.2 |
| 6,481,375 B1 | | 11/2002 | Scalf | 119/52.2 |
| 6,546,894 B2 | * | 4/2003 | Chrisco et al. | 119/52.2 |
| 6,581,540 B1 | * | 6/2003 | LaVanish | 119/51.01 |

OTHER PUBLICATIONS

Gardensong Feeders, Coach Lamp Bird Feeder No. 469–6 and Carriage Lamp Bird Feeder No. 470–6, p. 11.
Terra Cotta, Bird Feeders No. 4101–4 and 4106–4, p. 14.
Top Flight Lifetime Feeders, Fortress Squirrel Proof Bird Feeder, 5108, 1997.
Top Flight Lifetime Feeders, Fortress Triple Tube Bird Feeder No. 5124–2, Bird Feeder No. 5101–4 and Finch Feeder No. 5102–4, 5108.

* cited by examiner

*Primary Examiner*—Son T. Nguyen
(74) *Attorney, Agent, or Firm*—Jacobson Holman PLLC (57) ABSTRACT

A bird feeder wherein a housing includes a plurality of modular hopper elements with a floor underlying and supporting the hopper elements and a roof overlying the hopper elements, the hopper elements including impermeable side walls juxtaposed to form a hopper assembly of maximum capacity and minimum footprint and a front wall with feed apertures to enable birds to access bird food within the hopper element. Each hopper may be selectively removed and replaced without disturbing the other elements. In one embodiment, the hopper elements form segments of an inverted frustoconical hopper assembly which may be selectively and individually removed from the bird feeder without disassembling the housing. In another embodiment, each of the hopper elements is rectangular in transverse cross-section, and comprises a pair of spaced, generally triangular, parallel impermeable side walls interconnected by a pair of spaced, generally rectangular, front walls angled from the upper portion of the hopper element to the lower portion thereof, with the parallel impermeable side walls of adjacent hopper elements being juxtaposed in the housing and a plurality of feed apertures defined in each of the angled front walls adjacent the lower end thereof. A seed catcher may be provided underlying each hopper element with a depression formed in the floor of the housing to position the seed catchers.

15 Claims, 11 Drawing Sheets

BIRD FEEDER WITH MODULAR BIRD SEED RESERVOIRS

RELATED APPLICATION

This application is a continuation-in-part of application Ser. No. 10/166,070 filed Jun. 11, 2002, the subject matter of which is incorporated herein in its entirety by reference.

BACKGROUND OF THE INVENTION

1. Field of the Invention

This invention relates to bird feeders and relates more particularly to the type of bird feeder which comprises a housing with a hopper carried by the housing for receipt of bird food, and support for the bird feeder such as a post or a hanger for attaching the housing to a support for the bird feeder, such as a hook, a tree limb, or the like. Commonly, the hopper for bird feeders of this type comprise a cylindrical or conical transparent plastic tube with a multiplicity of feed ports or openings intermediate the top and bottom portions of the tube. In some such bird feeders, the housing includes a wire cage surrounding the hopper to minimize access to the feed port by squirrels and other small animals.

Another common form of commercially available bird feeders are "gazebo-style" bird feeders which, like an ordinary gazebo, have a floor, a plurality of vertical supports and an overhanging roof with the bird seed reservoir carried by the floor beneath the roof. Usually, the roof may include an opening with a removable cap enabling the reservoir to be refilled from above. A wire loop or the like may be attached to the housing for supporting the bird feeder in use, or the floor may be simply mounted on a post secured in the ground.

2. Description of the Related Art

Commercially available gazebo-style and other bird feeders currently on the market have several disadvantages. First, access to the bird seed hopper or reservoir through an opening in the roof is often difficult, particularly if an attempt is made to fill the hopper without removing the bird feeder from its support or if the bird feeder is mounted at a level above the user's sight. Often, a funnel or other such implement is necessary to facilitate filling the reservoir without spilling large amounts of seed during the filling process.

Additionally, providing sources of different types of bird seed to attract a variety of birds usually requires the use of multiple bird feeders. Compartmented reservoirs or hoppers are available in some bird feeder products, but filling the individual compartments with different types of bird seed is particularly tedious.

Another problem associated with bird feeders currently available is associated with cleaning of the reservoirs. Over time, the bird food in the hopper may tend to cake or spoil from environmental moisture and heat, fouling the hopper, precluding free flow of bird seed through the access or feed apertures and necessitating the removal of the reservoir from the housing. This process is especially difficult in gazebo-style bird feeders since the roof may be fixedly attached to the floor or base via the vertical posts by glue or screws. In such circumstances, removing the reservoir or hopper from the housing for cleaning and replacing the same may be impossible or, at best, is difficult and time consuming and, in some instances, requires extraneous tools such as screw drivers or the like.

SUMMARY OF THE INVENTION

With the foregoing in mind, it is a primary object of this invention to provide a bird feeder which overcomes the aforementioned and other such disadvantages in a simple and inexpensive manner. More specifically, the instant invention is directed to a bird feeder wherein the housing includes a floor underlying and supporting a plurality of modular hopper elements, with a roof overlying the hopper elements to protect the hopper elements and the floor from the weather, and, with the hopper elements selectively removable from the housing to be refilled or cleaned, or to be entirely replaced by other modular hopper elements which may contain the same or different forms of bird food.

A still further object of this invention is to provide, in a preferred embodiment, a plurality of modular hopper elements, each of which comprises a segment of a conical hopper assembly with the hopper elements being individually removed from and/or placed in the housing without need to dissemble the housing elements.

Yet another object of this invention according to a preferred embodiment is the provision of individual segmental hopper elements for a bird feeder including mating side portions adapted to be juxtaposed in use to form a hopper assembly which maximizes capacity while minimizing the footprint of the assembly.

Another object of the instant invention is to provide an assembly of segmental hoppers of the type described wherein the non-juxtaposed portions together define a generally frustoconical outer surface with apertures adapted to carry feed ports.

An object of a further embodiment of this invention is the incorporation of a plurality of modular bird food reservoirs or hopper elements in a common gazebo-style housing wherein each of the hopper elements is generally rectangular in transverse cross-section and comprises a pair of parallel sides interconnected by a pair of sides angled from the upper portion to the lower portion of the hopper element, with the parallel sides of adjacent hopper elements being juxtaposed in the housing to form a hopper assembly in the shape of an inverted pyramid with a plurality of apertures defined in each of the angled sides adjacent the bottom portion of each hopper element through which birds may access bird food within the reservoir.

Yet another object of this embodiment of the invention is the inclusion of a seed catcher underlying the lower portion of each modular hopper element and extending outwardly from each of the angled sides below the apertures to catch bird seed that escapes from the apertures in use. Additionally, the floor of the housing may include a depression dimensioned to receive the seed catchers of the hopper elements to position the hopper elements relative to each other and relative to the housing.

BRIEF DESCRIPTION OF THE DRAWINGS

These and other objects, features and many of the attendant advantages of the invention will be better understood upon a reading of the following detailed description when considered in connection with the accompanying drawings wherein.

Like reference characters refer to like parts throughout the several views of the drawings.

DETAILED DESCRIPTION OF THE PREFERRED EMBODIMENTS

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring now to the drawings, and more particularly to FIGS. 1–5, an embodiment of a gazebo-style bird feeder incorporating removable modular hopper elements according to the instant inventive concepts is designated generally by the reference numeral 20, and comprises basically a housing 30 and a plurality of modular hopper elements 50. Although only two such hopper elements are illustrated, the number and size of the hopper elements may obviously be increased or decreased without departing from the instant inventive concepts.

Figure 1:
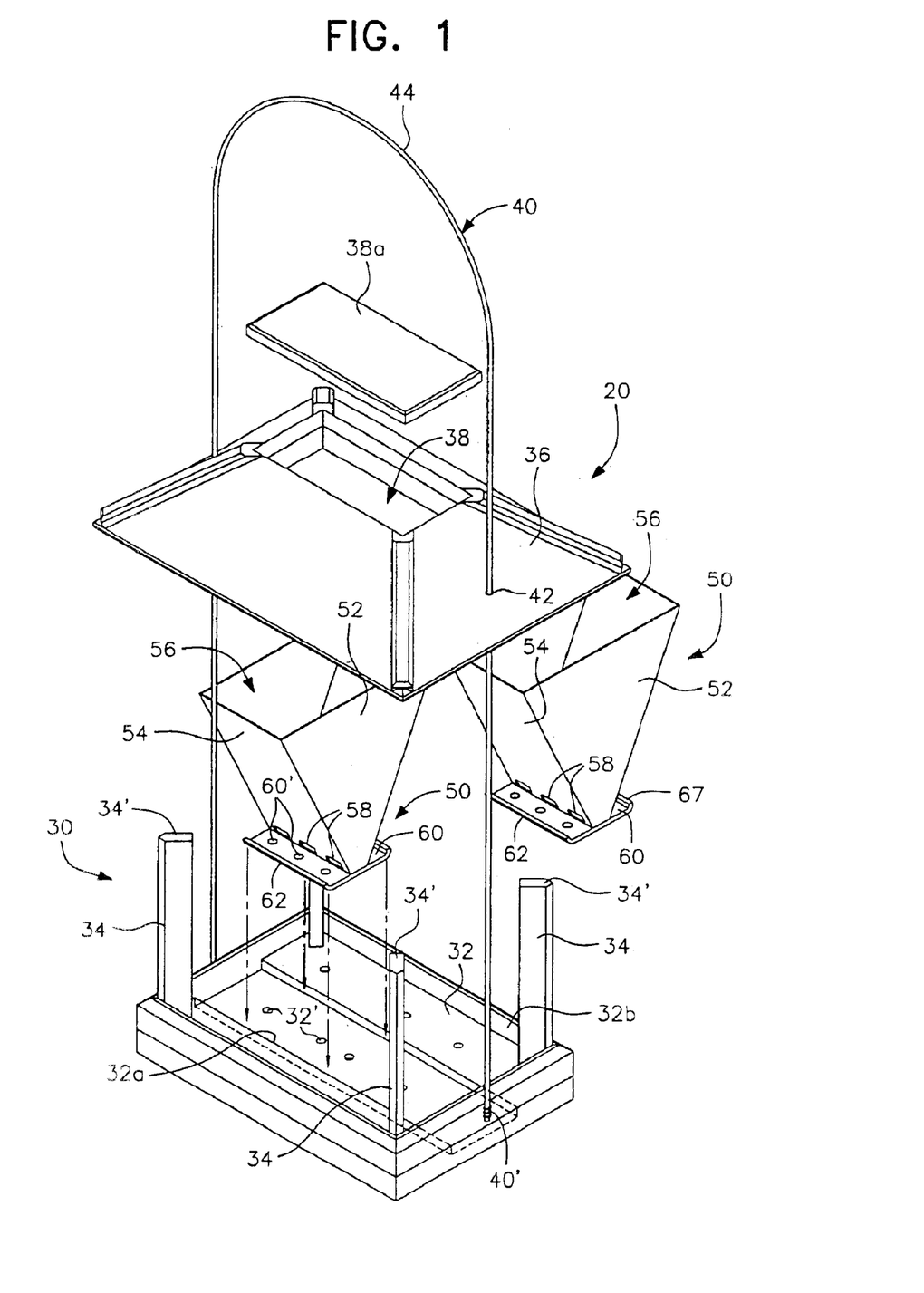
FIG. 1 is an exploded view of one embodiment of a gazebo-style bird feeder according to this invention, showing a pair of modular bird seed hoppers removably carried thereby.

The housing 30 includes a floor 32 underlying and supporting each of the hopper elements 50 in a manner to be described in more detailed hereinafter, a plurality of upstanding posts 34, preferably fixedly secured to the corners of the floor 32 in any conventional manner, and a roof 36 overlying each of the hopper elements 50 to protect the same and the floor 32 from the elements in a well-known manner. The roof 36 may include an opening 38 covered by a removable cap 38a, if desired, to enable access to the hopper elements 50 from above, although, for many applications, such a construction will not be necessary in view of the removable nature of the hopper elements.

The foregoing housing components are preferably formed of wood for appearance sake, but can be formed of plastic or other materials, simulating a wooden gazebo. In contrast, the hopper elements are generally formed from any well known plastics material by injection molding or any other conventional manner, and may be transparent to enable the level of bird food within the individual hopper elements to be visually observed.

Preferably, the roof 36 simply rests on the upper ends 34' of the posts 34 and is otherwise unattached to the posts. If desired, the upper ends 34' of the posts 34 may be angled to better accommodate the angled undersurface of the roof 36 (not shown). Although, in the embodiment of FIGS. 1–5, the roof 36 is not fixedly secured to the posts 34, if desired, screws or the like (not shown) may be provided to better secure the roof to the posts, while permitting the roof to be removed when necessary for access to the modular hopper elements 50.

Figure 4:
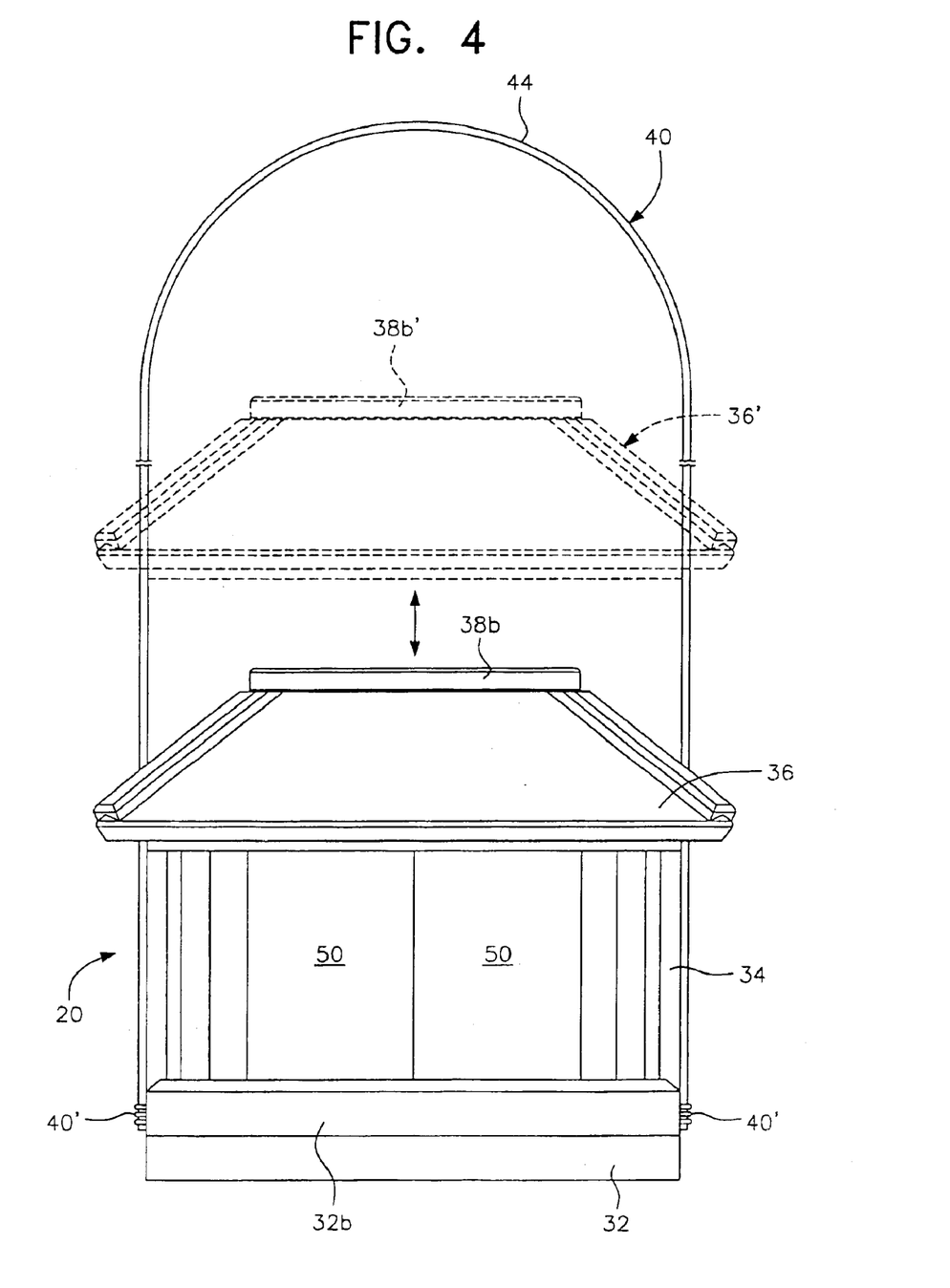
FIG. 4 is a side elevational view thereof showing the roof lifted in dotted lines for removal of one or more of the hopper elements.
Figure 5:
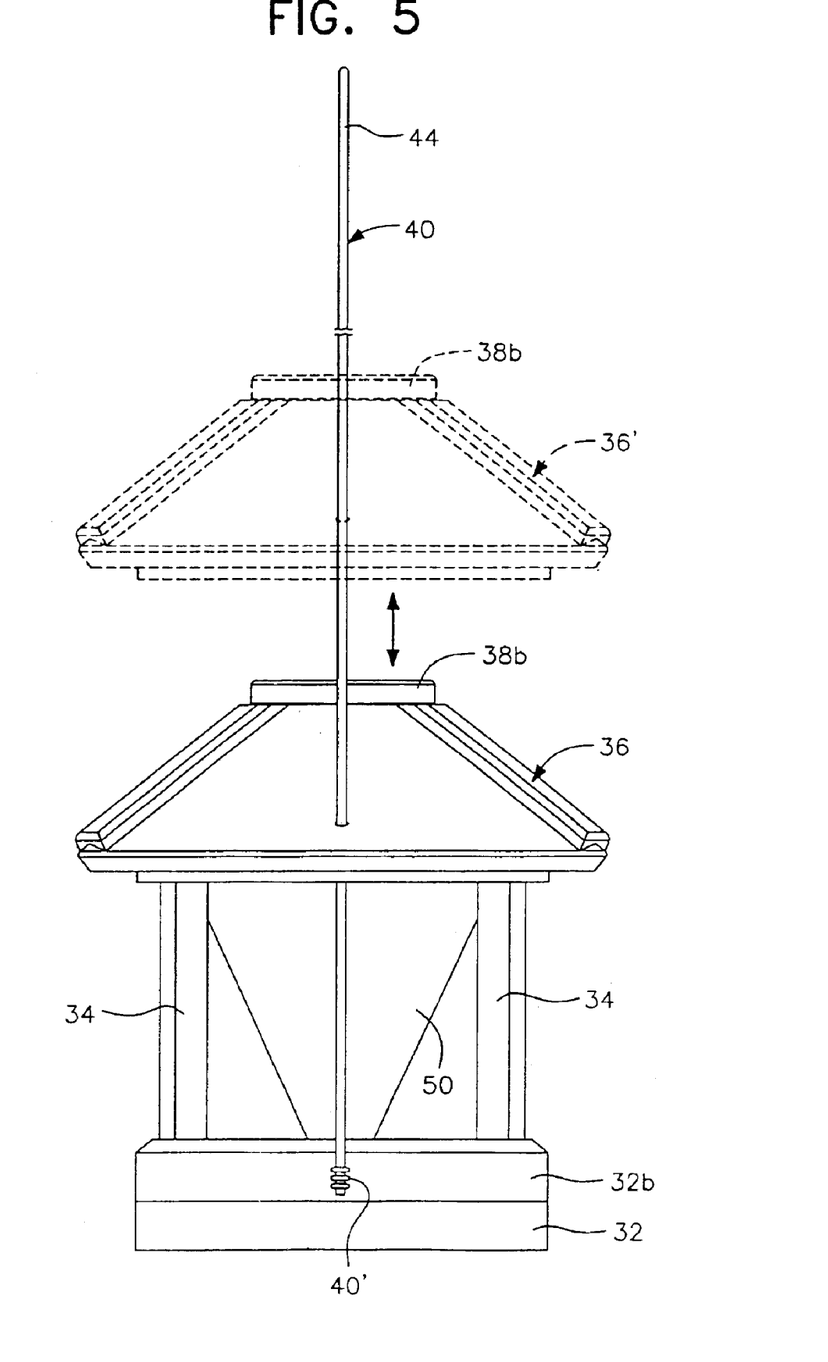
FIG. 5 is an end view of the bird feeder of FIG. 1 with the lifted roof in dotted lines similar to FIG. 4.
Figure 6:
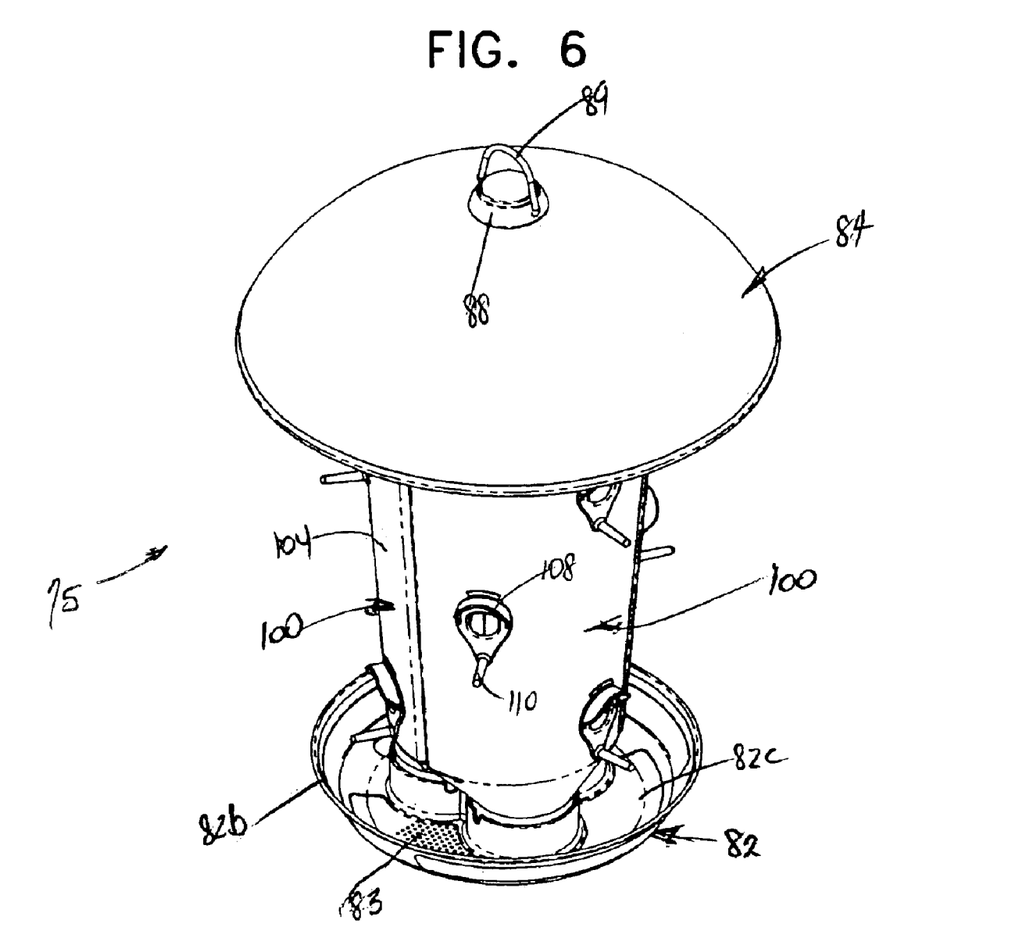
FIG. 6 is a perspective view of another embodiment of a bird feeder with modular bird seed reservoirs according to this invention.
Figure 7:
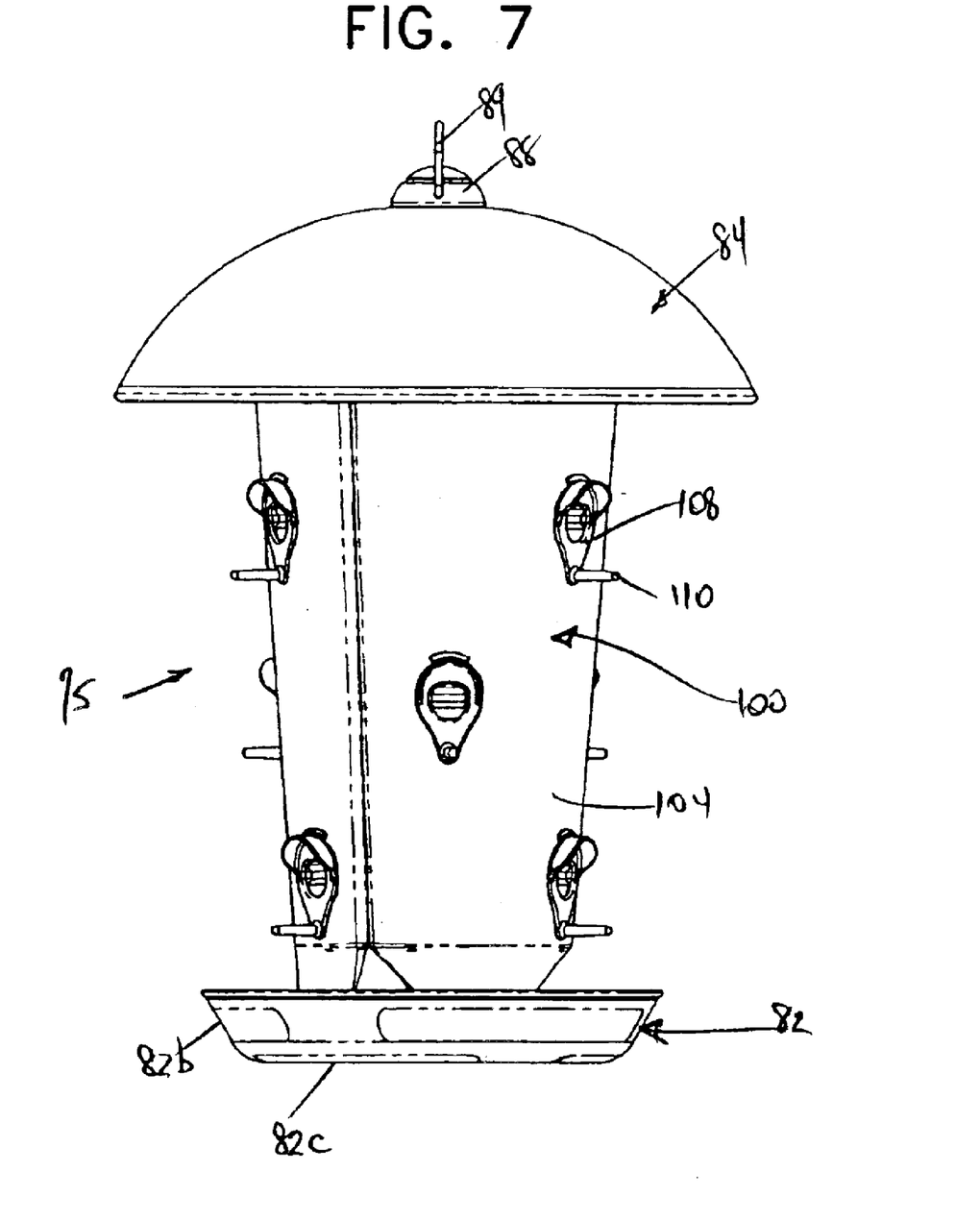
FIG. 7 is a side elevational view of the bird feeder of FIG. 6.
Figure 8:
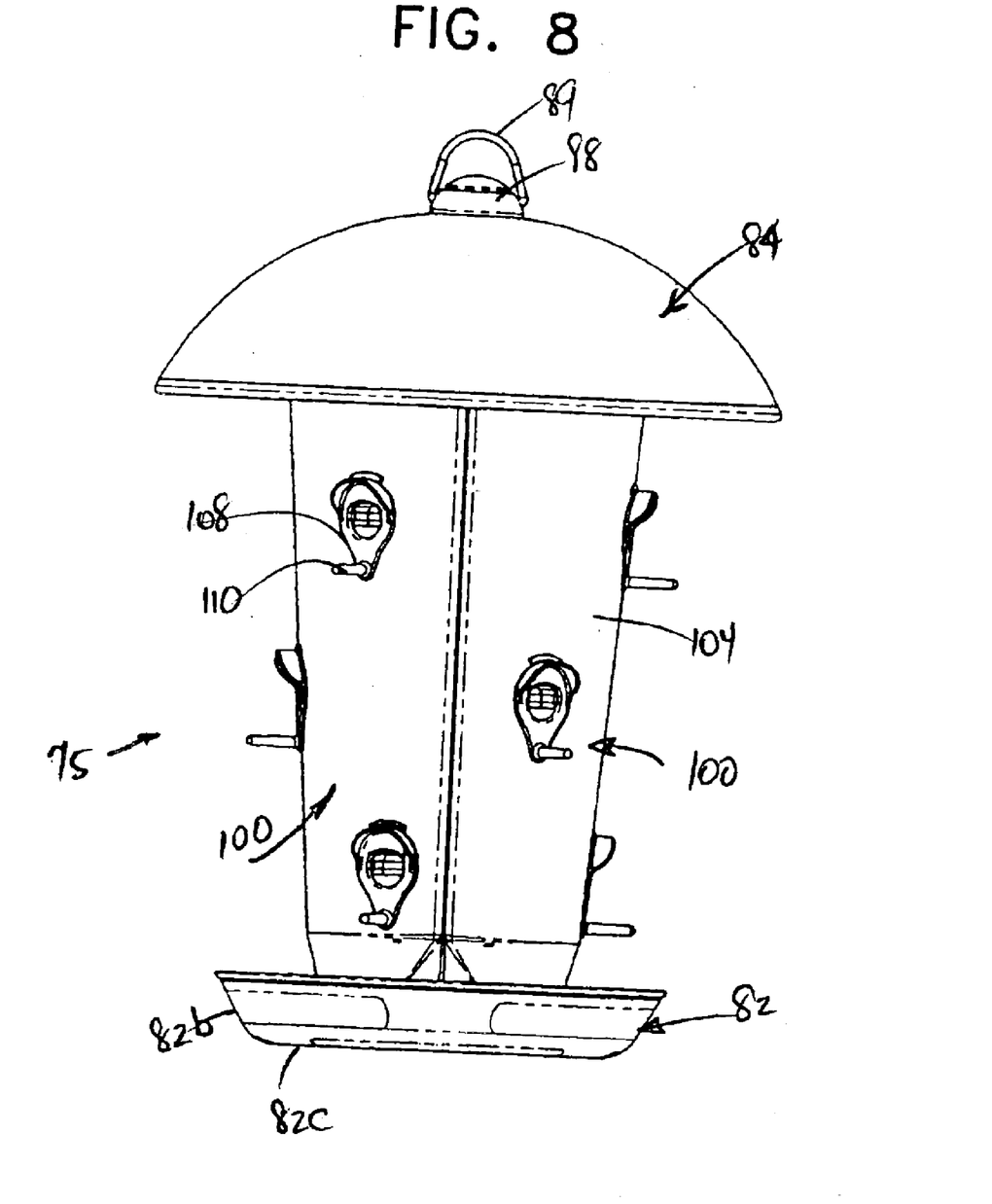
FIG. 8 is a further side elevational view thereof taken at 120 degrees relative to FIG. 7.
Figure 9:
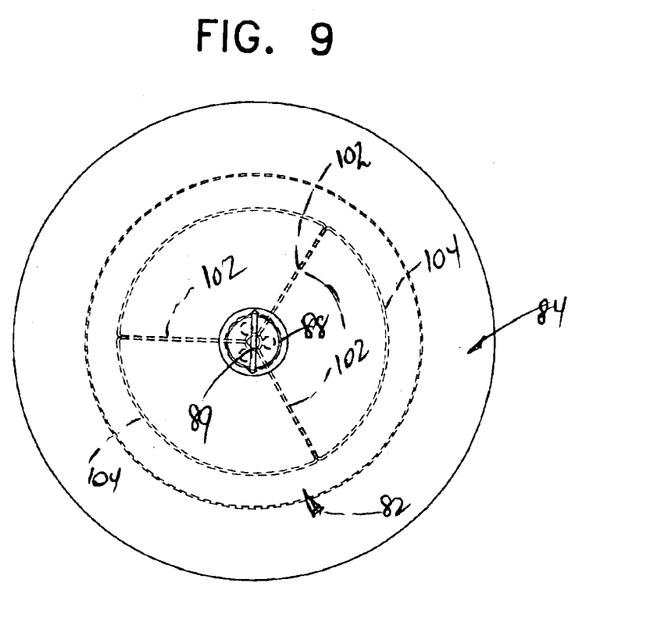
FIG. 9 is a top plan view of the bird feeder of FIG. 6.
Figure 10:
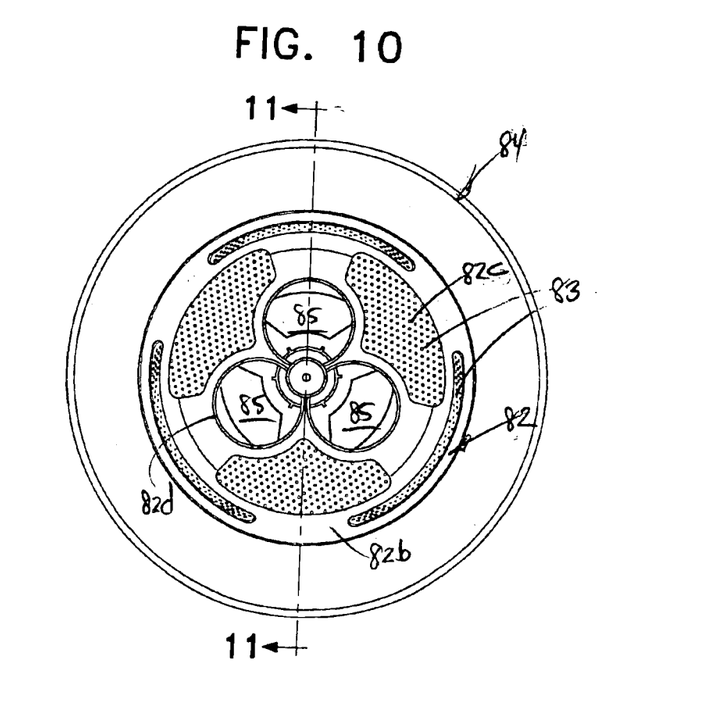
FIG. 10 is a bottom plan view thereof.

As shown in FIGS. 1, 4 and 5, a rope or cable 40 may have its opposed ends 40' connected to the edges of the floor 32 in any conventional manner, with intermediate portions passing through apertures 42 in the roof 36 to form a loop 44 for attachment to a supporting element such as a hook, a branch of a tree or the like (not shown). In this manner, the roof 36 may be slid upwardly along the rope 40 as shown in dotted lines at 36' in FIGS. 4 and 5 to readily access the hopper elements 50 to enable removal of the same for cleaning, refilling or replacement.

Figure 2:
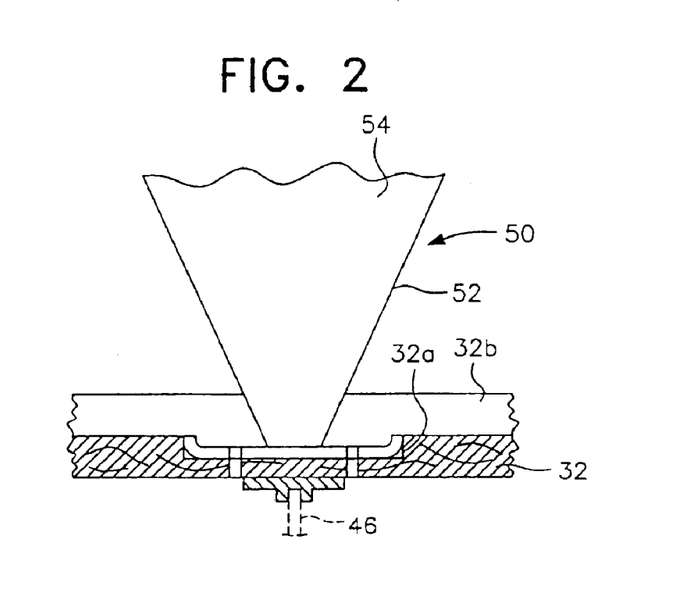
FIG. 2 is an enlarged fragmentary cross-sectional view showing the manner in which the bird seed catcher portion of a modular hopper element seats in a depression in the floor of the housing, an optional supporting post for the bird feeder being shown in dotted lines.
Figure 3:
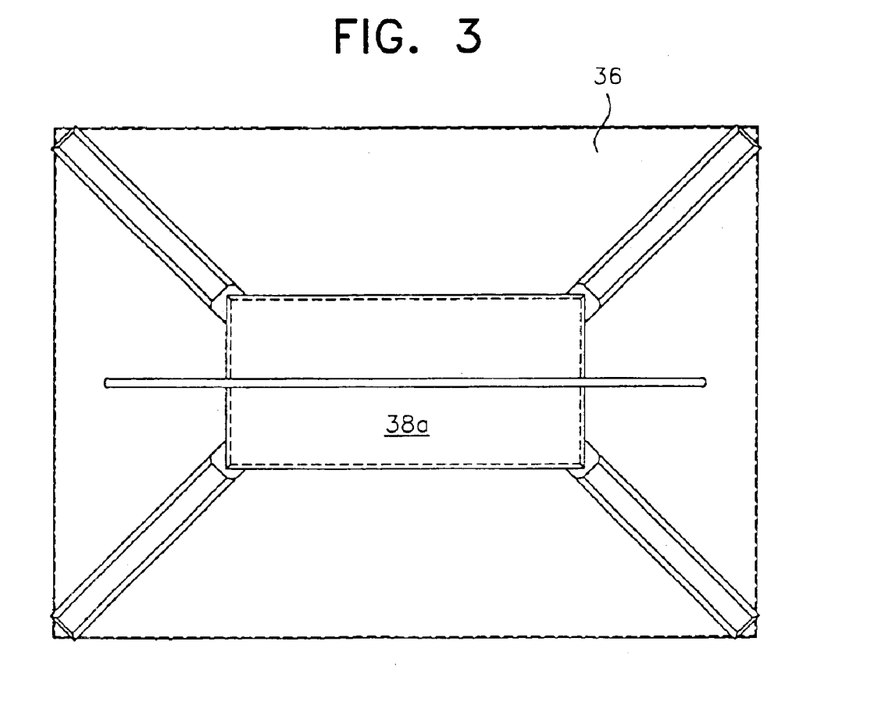
FIG. 3 is a top plan view of the bird feeder of FIG. 1.

Alternatively, or additionally, a supporting post 46 may be threadably secured to the bottom of the floor 32 as seen in dotted lines in FIG. 2.

In the embodiment of FIGS. 1–5 as illustrated in the drawings, each of the hopper elements 50 is rectangular in transverse cross-section, and comprises a plurality of spaced, generally triangular, parallel sides 52 interconnected by a pair of spaced, generally rectangular, sides 54 angled from the upper portion of each hopper element 50 to the lower portion thereof to provide an enlarged internal cavity or reservoir 56 for reception of a quantity of bird seed or other bird food (not shown). At the bottom of each of the angled sides 54, a plurality of apertures 58 are defined through which birds may access bird food within the reservoirs 56 in a well known manner.

A seed catcher 60 preferably underlies the lower portion of each hopper 50 and extends outwardly from each of the angled sides 54 below the apertures 58. The seed catchers 60 may have upturned edges 62 to facilitate retaining excess bird seed escaping through the apertures 58. A depression 32a is preferably defined in the floor 32 of the housing 30, with the seed catchers 60 fitting within the depression 32a to position the hopper elements 50 relative to each other, with the parallel sides 52 of adjacent hopper elements 50 being juxtaposed within the housing 30.

Drainage holes 60' may be formed in the seed catchers 60 and drainage holes 32' may be formed in the floor 32 to permit rain or water from nearby sprinklers to flow out of the bird feeder 20 and a peripheral lip 32b may be provided about the floor 32 to retain bird seed or the like overflowing the seed catchers 60.

The use and operation of the gazebo-style bird feeder 20 of this invention will now be readily understood by those of ordinary skill in the art. One or more modular hopper elements 50 may be pre-filled with bird food. The individual hopper elements 50 can contain the same bird food or different types of bird food to attract different birds. The size and positioning of the apertures 58 can be varied to accommodate different types of bird food.

The roof 36 of the bird feeder 20 may be moved relative to the floor 32 to enable the hopper elements 50 to be selectively positioned within the housing 30, with the seed catcher portions 60 thereof seated in the depression 32a in the floor 32 to position the hopper elements 50 relative to each other and relative to the housing 30. The bird feeder 20 can then be either supported via a post such as 46 fixed in the ground, or a rope or cable loop 44 engaged over a hook, a tree limb or the like.

When an individual hopper element is empty or needs cleaning, the roof 36 may be lifted, the modular hopper element 50 removed, cleaned, refilled, or simply replaced by a different modular element precharged with bird food. The roof 36 is then repositioned over the posts 34 of the housing 30 and ready for further use.

Although the bird feeder 20 is generally shown as rectangular, other shapes of gazebo-style bird feeders can incorporate the same inventive concepts as the embodiment shown in FIGS. 1–5 of the drawings without departing from the instant inventive concepts. For example, reference is made to FIGS. 6–13 for another embodiment of a bird feeder designated generally by the reference numeral 75 and incorporating a plurality of individually removable modular hopper elements 100. Although three substantially identical hopper elements 100 are illustrated, the number and size of the hopper elements may obviously be increased or decreased without departing from the instant inventive concepts. However, the three hopper elements 100, each of which forms one-third of the hopper element assembly, is preferred for ease in manufacture, versatility in use, and the aesthetic nature of the final product.

The bird feeder 75 includes a housing 80 comprising a floor or base 82 underlying and supporting the hopper elements 100 in a manner to be described in more detail hereinafter, a domed cover or roof 84, and a supporting post 86 interconnecting the base 82 and the roof 84. See, particularly, FIG. 11. The lower end of the supporting post 86 is threadably engaged in an upstanding central boss 82a forming part of the base 82, with a flange 87 on the post 86 seated on the boss 82a. The upper end of the post 86 extends through an aperture 84a in the roof 84 and is threadably captured by a cap 88 which may hingedly carry a loop 89 for attachment to a supporting element such as a hook, a branch of a tree or the like (not shown). Thus, the assembly of the base or floor 82, the cover 84 and the post 86 together define a rigid support, the housing 80, for carrying the hopper elements 100.

Figure 11:
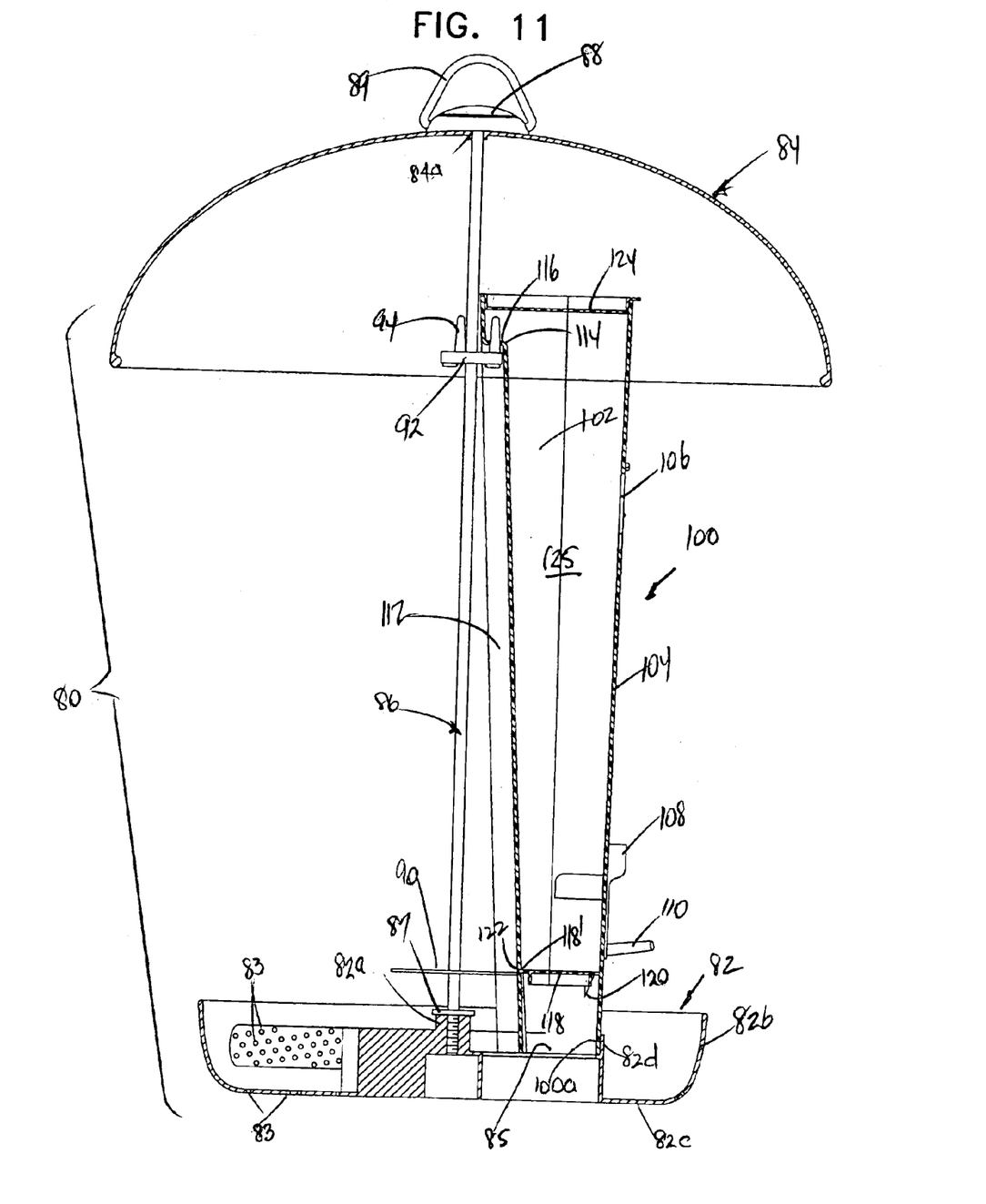
FIG. 11 is a partial cross-sectional view taken along lines 11—11 of FIG. 10.
Figure 12:
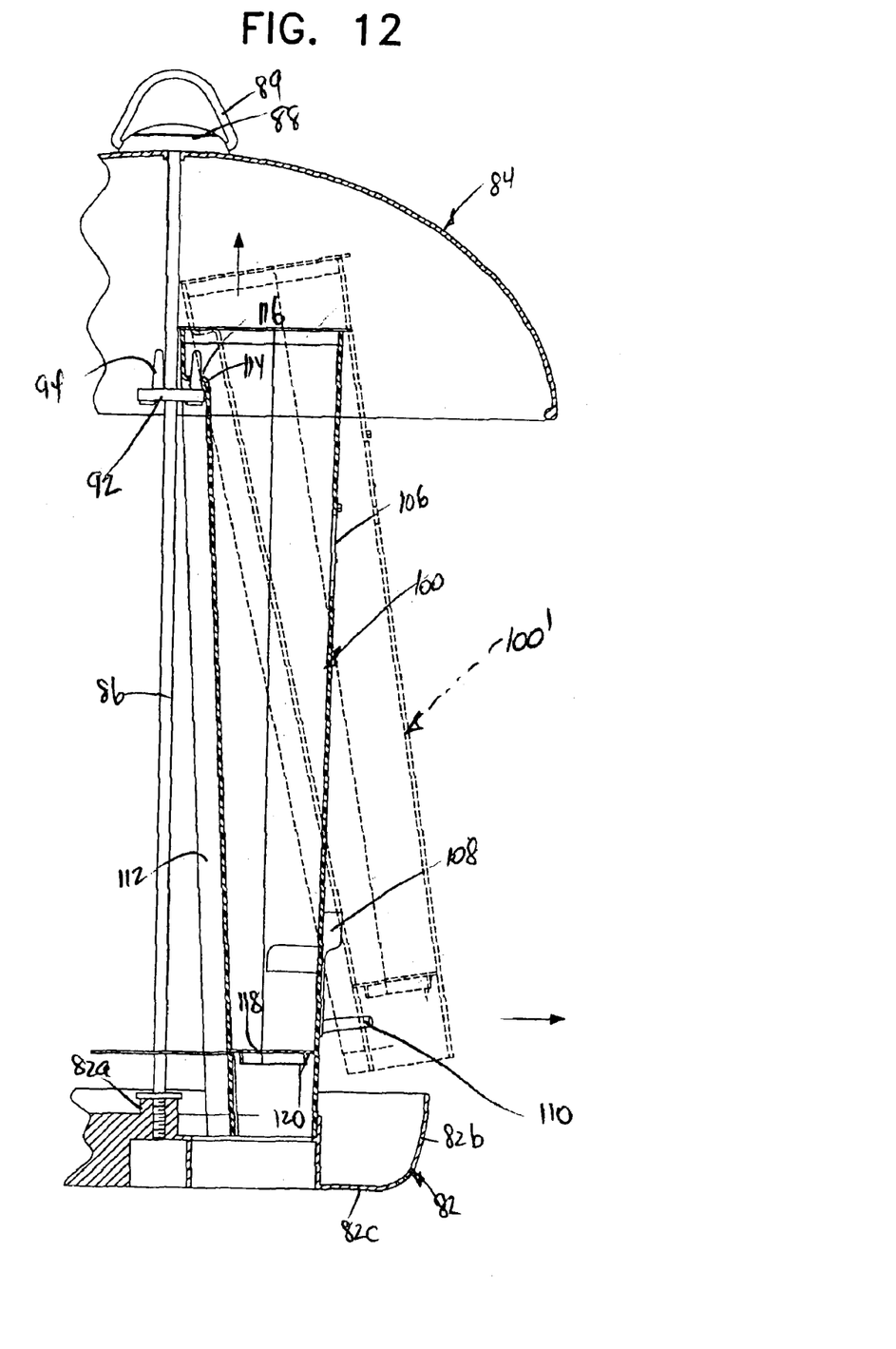
FIG. 12 is a view similar to FIG. 11 showing the manner in which a modular hopper element can be removed or inserted in dotted lines.
Figure 13:
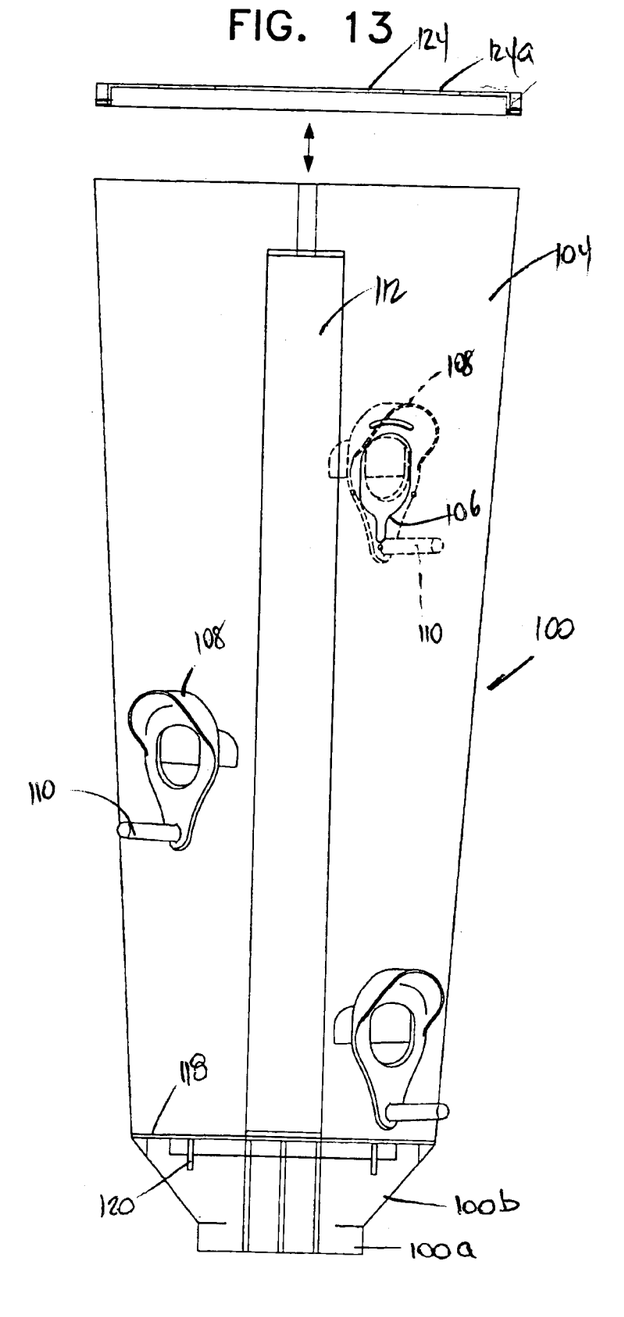
FIG. 13 is an elevational view of one of the hopper elements of the bird feeder of FIG. 6 with the cover lifted and with one of the feed ports being shown in dotted lines for illustrative clarity.

The base 82 preferably includes an upstanding peripheral wall 82b and horizontally extending portions 82c which together define a seed catcher to receive bird seed falling from the feed ports 108. A multiplicity of apertures 83 may be formed in the horizontally and vertically extending portions of the base 82 to permit rain water or the like to escape therefrom.

Although the elements of the housing 80 may be formed of any suitable material such as a rigid plastic material, they are preferably formed of metal in any well known manner to enhance the strength of the assembly, and minimize damage from squirrels and the like. Each of the hopper elements 100 is formed from any well known plastics material in any conventional manner and is, preferably, transparent to enable the level of bird food within the individual hopper elements to be visually observed.

The individual hopper elements 100 each comprise a pair of side walls 102 extending at approximately a 120 degree angle to each other and a curved and tapered front wall 104. Thus, when the three hopper elements 100 are in the assembled position seen particularly in FIGS. 6–10, the walls 102 of a particular hopper element 100 are juxtaposed to comparable walls of the other two hopper elements 100 so that the front walls 104 together form a generally inverted frustoconical hopper assembly. Each of the front walls 104 may be provided with a plurality of apertures 106 adapted to slidingly receive feed ports 108 with perches 110 in a well known manner. See particularly FIG. 13.

Portions of the inner edges of the walls 100 of each hopper element may be connected by an arcuate wall 112 to provide a circular central well when the hopper elements are assembled which surrounds an enlarged spacer ring 90 carried by the post 86. The upper end of each arcuate wall 112 terminates in a shoulder 114 with a vertically extending aperture 116 defined therethrough. A support ring 92, also carried by the post 86, includes upstanding fingers at 94 received in apertures 116 to position the upper portions of the hopper elements when they are assembled in the housing 80.

A hopper floor member 118 may be removably supported on a multiplicity of ribs 120 formed on the walls 102, 104 of the hopper element 100 for ease of cleaning the hopper element. Edge portions 118' of the floor 118 may additionally be supported by engagement in a slit 122 in the arcuate wall 112.

A removable cover 124 may be provided to cover the top of each hopper element 100 and, thereby, form an enclosed cavity 125 for reception of a quantity of bird food (not shown) that can be accessed through the feed ports 108 in a well known manner. The cover 124 may include outstanding finger-engaging lips 124a to facilitate disengaging the same from the hopper elements 100.

A series of upstanding peripheral walls 82d are formed by the base 82 to define wells 85 for reception of complementary-shaped foot portions 100a on the tapered lower ends 100b of each hopper element 100. As will be seen particularly in FIG. 12, with the housing 80 fully assembled, each of the hopper elements 100 can be individually and selective supported thereby by tilting the same in the manner shown in dotted lines at 100', with the foot portions 100a of the hopper element 100 seated within a well 85 in the base 82 and the aperture 116 in the shoulder 114 engaged over one of the fingers 94 on the support ring 92. Obviously, reversing that procedure enables removing the hopper element 100 from the housing 80 for refilling, replacement or cleaning.

Thus, the embodiment of FIGS. 6–13 enables individual hopper elements 100 to be removed from the housing 80 without disassembling the housing and with no need for extraneous tools such as screwdrivers or the like. In this manner, inexpensive bird feeder with multiple modular hopper elements is provided which is simple to use, aesthetic in appearance and versatile, enabling the bird feeder of this invention to be provided with large quantities of a single bird food, or individual hoppers containing different bird food to attract a plurality of bird species.

The foregoing descriptions and drawings should be considered as illustrative only of the principles of the invention. Numerous applications of the present invention will readily occur to those skilled in the art. Therefore, it is not desired to limit the invention to the preferred embodiments or the exact construction and operation shown and described. Rather, all suitable modifications and equivalents may be resorted to, falling within the scope of the invention.

What is claimed is:

1. A bird feeder comprising a housing and a plurality of modular hopper elements, said housing including a base underlying and supporting said hopper elements and a roof overlying said hopper elements, each hopper element including a floor and upstanding walls together defining an internal cavity for receiving a quantity of bird food, said walls including at least one impermeable side wall and at least one front wall including at least one feed aperture through which birds may access bird food within said cavity, an impermeable side wall of each hopper element being juxtaposed to an impermeable side wall of at least one other hopper element in an assembled relationship of said hopper elements, said housing further including a central post interconnecting said base and said roof, a support ring being carried by said post and having an upstanding finger for each of said plurality of hopper elements, each hopper element including a shoulder portion defining an aperture slidably receivable over one of said fingers, and each hopper element being removable from said housing to be cleaned, refilled and/or replaced when empty without removing any other hopper element from said housing.

2. The bird feeder of claim 1, wherein each of said hopper elements is tapered from an enlarged upper portion to a smaller lower portion.

3. The bird feeder of claim 1 wherein said hopper assembly is generally frustoconical and each of said hopper elements defines a segment of said hopper assembly.

4. The bird feeder of claim 3 wherein each hopper element includes a pair of impermeable side walls interconnected by said front wall, said impermeable side walls of each hopper element being juxtaposed to an impermeable side wall of two adjacent hopper elements in said hopper assembly.

5. The bird feeder of claim 4 wherein said hopper assembly includes three hopper elements, each hopper element including two impermeable side walls extending at about 120 degrees to each other, and a curved front wall.

6. The bird feeder of claim 5 further including a plurality of feed apertures in said curved front wall defining feed ports.

7. The bird feeder of claim 1, wherein each hopper element further includes tapered lower portions defining a terminal foot portion, said base including upstanding portions defining complementary-shaped wells to slidably receive said foot portion of said hopper element.

8. The bird feeder of claim 1, further including portions of said roof extending beyond the upper portions of said hopper elements and overhanging said base to protect said hopper elements and said base from weather.

9. A bird feeder comprising a central post, carrying a support ring near an upper end of said post, and a plurality of modular hopper elements, each hopper element including a floor and upstanding walls together defining an internal cavity for receiving a quantity of bird food, said walls including at least one side wall and at least one front wall having at least one feed aperture through which birds may access bird food within said cavity, a side wall of each hopper element being juxtaposed against a side wall of at least one other hopper element in an assembled relationship of said hopper elements, and each hopper element having a structure adjacent its upper end for securing said hopper elements to said support ring.

10. The bird feeder of claim 9, wherein said front walls are curved such that said plurality of hopper elements in said assembled relationship form a frustoconical shape tapering downwardly, with each of said hopper elements defining a segment of said hopper assembly.

11. The bird feeder of claim 10, wherein said hopper assembly includes three hopper elements, each hopper element including two side walls extending at about 120 degrees to each other.

12. The bird feeder of claim 9, wherein said structure for securing said hopper elements includes a shoulder portion defining an aperture that is slidably receivable over one of a plurality of fingers projecting upwardly from said support ring.

13. The bird feeder of claim 12, wherein each hopper element has two side walls, inner edges of said side walls being connected by an arcuate wall that faces said central post, the upper end of said arcuate wall being terminated in said shoulder portion.

14. The bird feeder of claim 9, further comprising a base underlying and supporting said hopper elements and a roof overlying said hopper elements.

15. The bird feeder of claim 9, wherein each hopper element is removable from said assembly to be cleaned, refilled and/or replaced when empty without removing any other hopper element from said assembly.

* * * * *